United States Patent [19]
de Abreu

[11] Patent Number: 5,345,983
[45] Date of Patent: Sep. 13, 1994

[54] FOUR SIDED ALTERNATING WOODWORKING PLANER WITH TWO SIDED COPYING SYSTEM

[75] Inventor: Alfredo F. de Abreu, Santo Tirso, Portugal

[73] Assignee: Mida–Maquinas Industriais Do Ave, Lda., Trofa, Portugal

[21] Appl. No.: 137,348

[22] Filed: Oct. 18, 1993

[51] Int. Cl.$^5$ .......................... B27C 1/00; B27C 5/00
[52] U.S. Cl. ..................... 144/116; 144/3 R; 144/114 R; 144/144 R; 144/242 R; 144/242 E; 144/245 R; 144/375; 269/25; 409/106; 409/130
[58] Field of Search ............ 269/13, 25; 409/97, 409/106, 125, 130; 144/3 R, 114, 116, 117 R, 117 B, 121, 122, 128, 134 R, 134 A, 137, 142, 144 R, 242 R, 242 E, 245 R, 375

[56] References Cited

U.S. PATENT DOCUMENTS

| | | | |
|---|---|---|---|
| 2,696,856 | 12/1954 | McCoy | 144/116 |
| 2,985,205 | 5/1961 | Mann | 144/116 |
| 3,165,976 | 1/1965 | Haspel | 144/144 R |
| 3,373,782 | 3/1968 | Pease | 144/116 |
| 3,942,566 | 3/1976 | Schmidt | 144/144 R |
| 4,174,007 | 11/1979 | Novello et al. | 144/116 |

*Primary Examiner*—W. Donald Bray
*Attorney, Agent, or Firm*—Goodman & Teitelbaum

[57] ABSTRACT

A woodworking planer having a main frame, a carriage slidingly mounted on the main frame to provide alternating longitudinal movement, a workpiece locking device also provided on the main frame for releasingly securing a workpiece in a fixed position relative to the longitudinal movement of the carriage, and cutting members provided on the carriage to plane four longitudinal sides of the workpiece simultaneously. The cutting members include horizontal cutter heads simultaneously moveable vertically towards and away from each other, and vertical cutter heads individually moveable horizontally towards and away from each other in response to predetermined shapes of a copying model co-acting with copying parts connected to the vertical cutter heads. The copying parts include spring biased rollers for following the predetermined shapes of the copying model. A feeder arrangement receives the workpieces for individually feeding the workpieces one at a time to the workpiece locking device. An inclined ramp receives the finished workpiece from the workpiece locking device, and directs the finished workpiece to a conveyor belt so that the finished workpiece can be transported away from the woodworking planer.

14 Claims, 3 Drawing Sheets

FOUR SIDED ALTERNATING WOODWORKING PLANER WITH TWO SIDED COPYING SYSTEM

BACKGROUND OF THE INVENTION

The invention relates to a woodworking machine and, more particularly, to a woodworking planer having cutter heads for planing four longitudinal sides of a workpiece simultaneously, and having a copying system cooperating with two of the cutter heads for planing two of the longitudinal sides of the workpiece to a predetermined shape determined by a copying model.

Woodworking machines such as planers are well known in the art. The inventor's U.S. Pat. No. 4,842,029 discloses a woodworking machine that can be used both as a planer and as a combined planing-milling machine. Furthermore, the inventor's U.S. Pat. No. 4,830,073 discloses a planing tool, and the inventor's U.S. Pat. No. 4,886,099 discloses a woodworking machine provided with a feeding system for the automatic delivery, advance and ejection of the workpieces. However, these prior art devices disclosed in the above patents are not particularly directed to a woodworking planer than can plane four longitudinal sides of the workpiece simultaneously, no less such a workpiece planer being provided with a copying system for planing two of the longitudinal sides of the workpiece to a predetermined shape determined by a copying model.

Therefore, there is presently a need for a woodworking planer which can plane four longitudinal sides of the workpiece simultaneously, which incorporates a copying system for planing two of the longitudinal sides of the workpiece to a predetermined shape determined by a copying model.

SUMMARY OF THE INVENTION

It is accordingly an object of the present invention to provide a woodworking planer, which avoids the problems of the prior art devices.

Another object of the present invention is to provide a woodworking planer, which can plane four longitudinal sides of a workpiece simultaneously.

A further object of the present invention is to provide a woodworking planer, which includes a copying system for planing two of the longitudinal sides of the workpiece to a predetermined shape determined by a copying model.

Still another object of the present invention is to provide a woodworking planer, which includes a carriage slidingly mounted on a main frame for alternating longitudinal movement along the main frame in a forward and backward direction, with workpiece locking means provided on the main frame for releasingly securing the workpiece in a fixed position relative to the longitudinal movement of the carriage.

Another object of the present invention is to provide a woodworking planer, which includes a pair of horizontal cutter heads and a pair of vertical cutting heads mounted on the carriage.

Still another object of the present invention is to provide a woodworking planer, which includes adjustable means to simultaneously move the horizontal cutter heads in a vertical direction towards and away from each other.

And another object of the present invention is to provide a woodworking planer, which includes copying means to individually move the vertical cutter heads in horizontal directions toward and away from each other with respect to a copying model for planing two sides of the workpiece to correspond to predetermined shapes of the copying model.

Yet another object of the present invention is to provide a woodworking planer, in which the copying means includes rollers for following the predetermined shapes of the copying model, the rollers being spring biased towards each other against the copying model.

Another object of the present invention is to provide a woodworking planer, which includes workpiece locking means for releasingly securing the workpiece in a fixed position on the main frame, the workpiece locking means including two longitudinally spaced apart locking bars, one of the locking bars having positioning means for providing longitudinal sliding thereof in order to clamp and release the workpiece.

Yet another object of the present invention is to provide a woodworking planer, which includes feeder means to receive the workpieces for individually feeding the workpieces one at a time to the workpiece locking means.

Another object of the present invention is to provide a woodworking planer, which includes an inclined ramp disposed under the workpiece locking means for directing the finished workpiece from the workpiece locking means to a conveyor belt so that the workpiece can be transported away from the woodworking planer.

Briefly, in accordance with the present invention, there is provided a woodworking planer having a main frame, a carriage slidingly mounted on the main frame for alternating longitudinal movement there along in a forward and backward direction, workpiece locking means also provided on the main frame for releasingly securing a workpiece in a fixed position relative to the longitudinal movement of the carriage, and cutting means provided on the carriage to plane four longitudinal sides of the workpiece simultaneously. The cutting means include horizontal and vertical cutter heads, the horizontal cutter heads being simultaneously moveable vertically towards and away from each other, and the vertical cutter heads being individually moveable horizontally towards and away from each other in response to predetermined shapes of a copying model, the copying model co-acting with copying means connected to the vertical cutter heads, where the copying means include rollers for following the predetermined shapes of the copying model, the rollers being spring biased towards each other to engage the copying model. The workpiece locking means include spaced apart locking bars for clamping the workpiece therebetween, one of the locking bars being slideable to permit the clamping and release of the workpiece. Feeder means receive the workpieces for indivudually feeding the workpieces one at a time to the workpiece locking means. An inclined ramp receives the finished workpiece from the workpiece locking means, and directs the finished workpiece to a conveyor belt so that the finished workpiece can be transported away from the woodworking planer.

BRIEF DESCRIPTION OF THE DRAWINGS

With the above and additional objects and advantages in view, as will hereinafter appear, this invention comprises the devices, combinations and arrangements of parts hereinafter described by way of example and illustrated in the accompanying drawings of a preferred embodiment in which.

In the various figures of the drawings, like reference characters designate like parts.

DESCRIPTION OF THE PREFERRED EMBODIMENT

Figure 1:
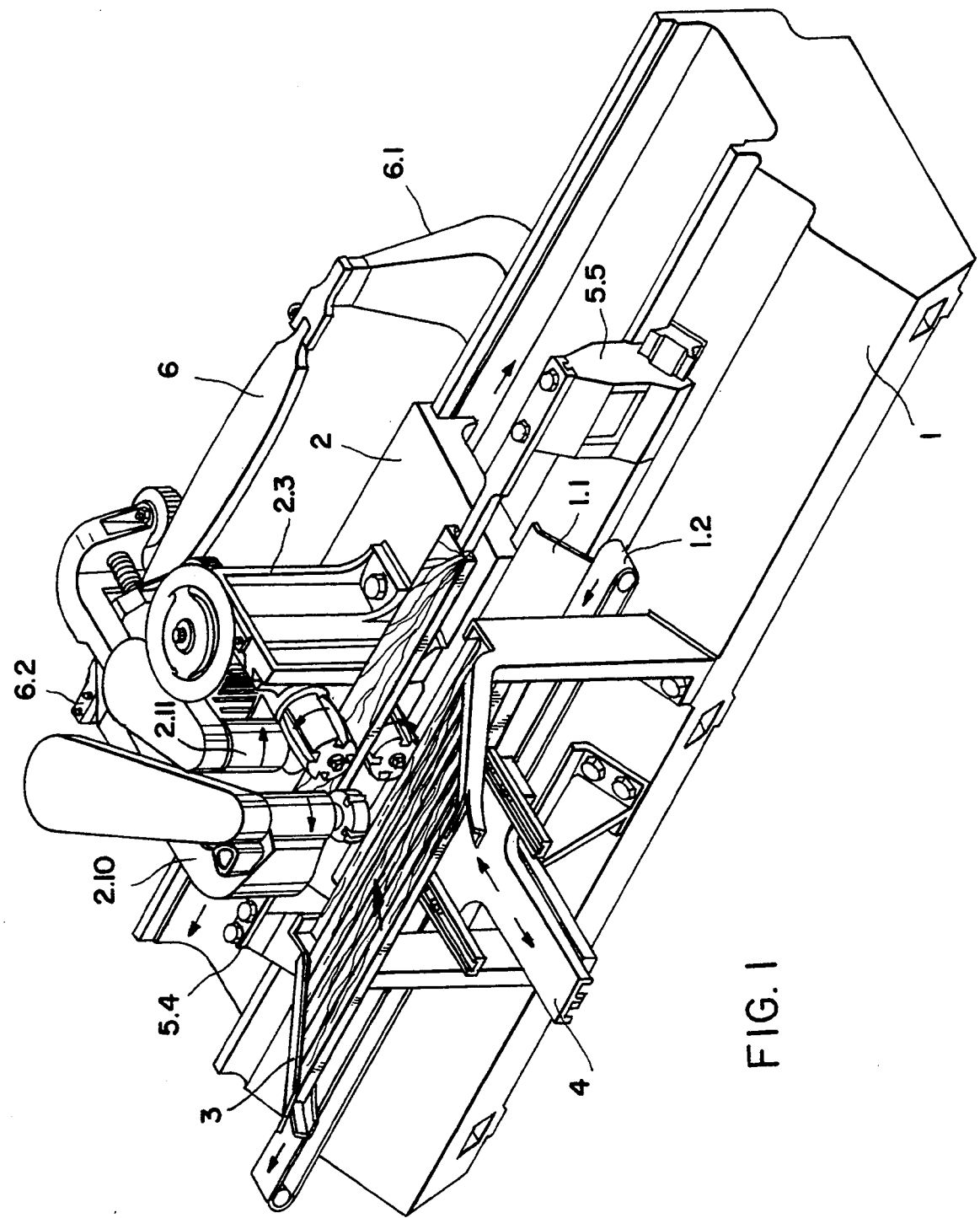
FIG. 1 is a perspective view of a woodworking planer according to the present invention.
Figure 2:
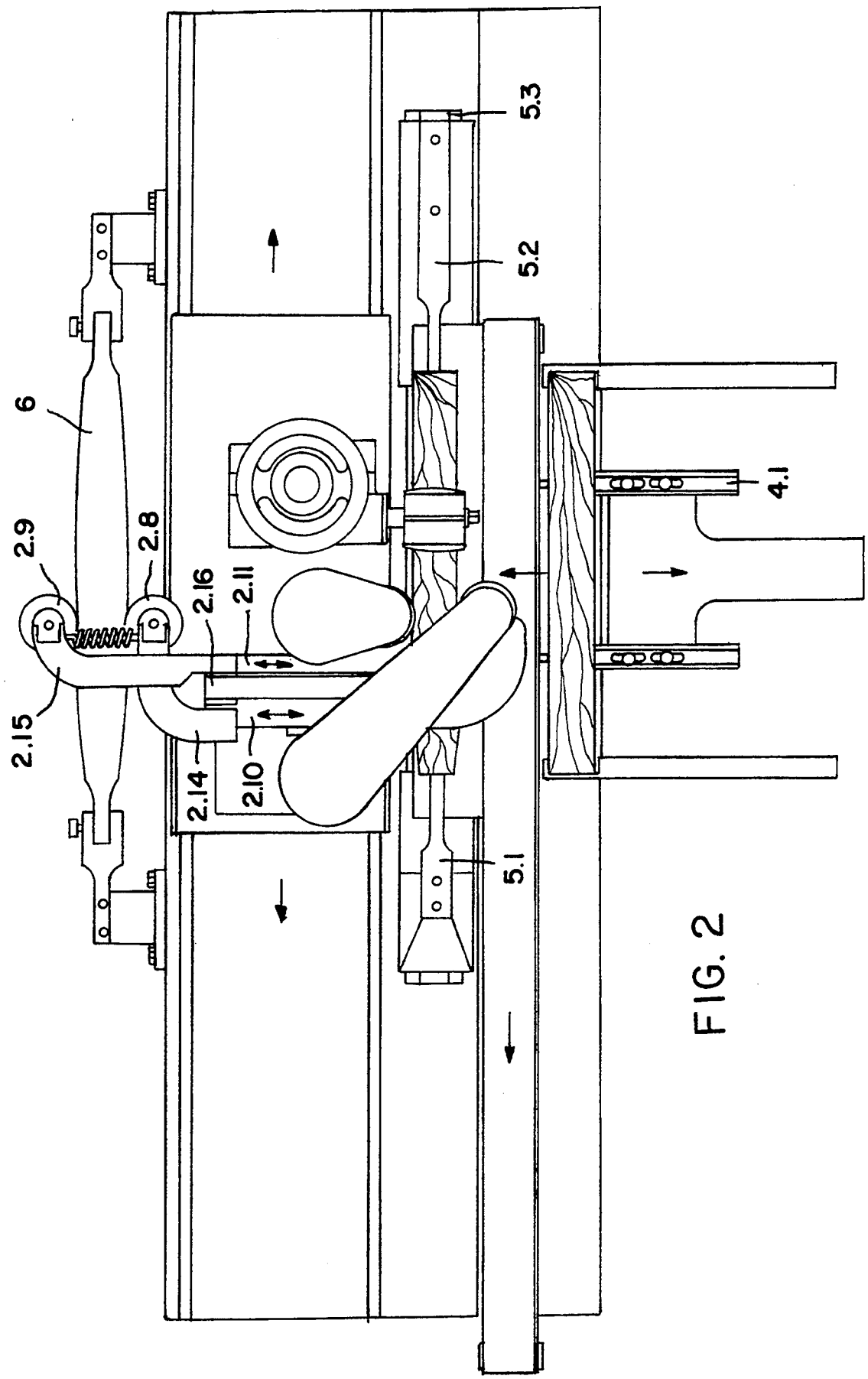
FIG. 2 is a top plan view of the woodworking planer of FIG. 1.
Figure 3:
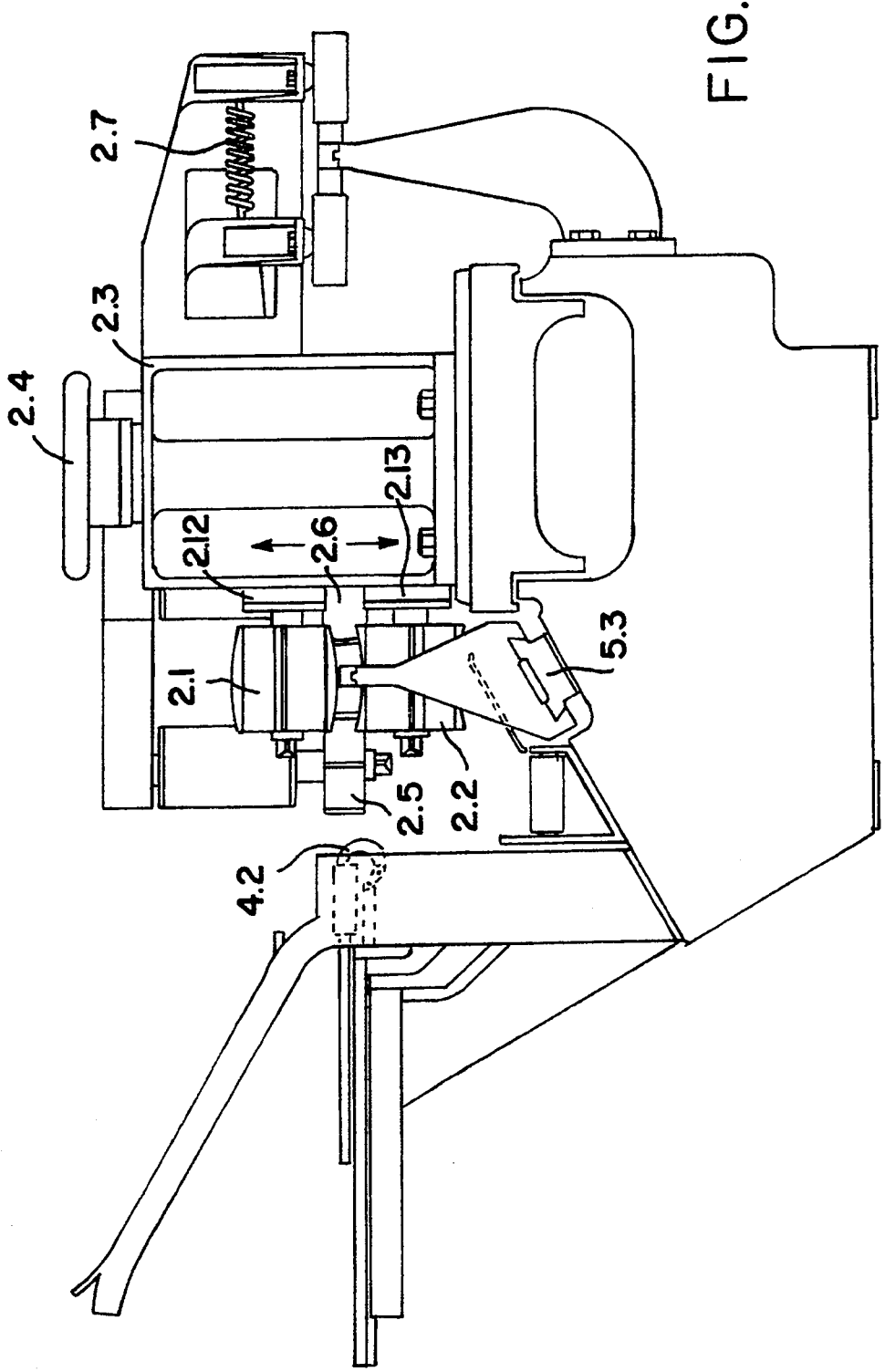
FIG. 3 is a right side elevational view of the woodworking planer of FIG. 1.

Referring now to the drawings, FIGS. 1 through 3 show a woodworking planer including a main frame 1, preferably fabricated from cast iron, which supports all the machine components as described below. The main frame 1 has a longitudinally extending recess in the upper portion thereof to function as a sliding guide for a carriage 2 which is supported therein, preferably by ball bearings, in such a manner which permits the carriage 2 to be alternatingly, longitudinally moved along the main frame sliding guide in a forward and backward direction. The alternating movement of the carriage 2 is provided by conventional means, such as the carriage 2 being driven by a hydraulic cylinder well known in the art, as will be discussed below.

A workpiece locking device is provided on the upper portion of the main frame 1 in front of the carriage 2 to secure the workpiece in a fixed position relative to the longitudinal movement of the carriage 2. The workpiece is preferably a wooden board, such as a barrel stave or other profile. The workpiece locking device includes two logitudinally spaced apart workpiece locking bars 5.1 and 5.2 positioned at opposite ends of the workpiece to fixedly clamp the workpiece therebetween so that the longitudinal length of the workpiece is parallel to the longitudinal movement of the carriage 2. Accordingly, the wider top and bottom longitudinal sides of the workpiece are secured in horizontal planes, and the thinner opposing longitudinal side edges of the workpieces are secured in vertical planes so that the workpiece can be properly planed in a manner set forth below.

The workpiece locking device further includes a longitudinally extending guide rail 5.3 secured on the upper portion of the main frame 1 by conventional fastening means. The lower portion of a first upright support 5.5 is fixedly secured by conventional means to one end (the right end as shown in the drawings) of the guide rail 5.3. The workpiece locking bar 5.2 is fixedly secured by bolts to the upper portion of the upright support 5.5 so that the workpiece locking bar 5.2 is held fixed in a longitudinally extending position relative to the main frame 1. The lower portion of a second upright support 5.4 is slidingly mounted on an opposite end (the left end as shown in the drawings) of the guide rail 5.3. The workpiece locking bar 5.1 is fixedly securented to the upper portion of the upright support 5.4 so that the workpiece locking bar 5.1 can be moved back and forth in a longitudinal direction when the upright support 5.4 slides along the guide rail 5.3 in the preselected direction.

Thus, the longitudinal movement of the workpiece locking bar 5.1 permits the workpiece to be both clamped and removed from between the workpiece locking bars 5.1 and 5.2. For example, with the workpiece locking bar 5.1 disposed near the left end of the guide rail 5.3, the workpiece is positioned between the workpiece locking bars 5.1 and 5.2. Then, the workpiece locking bar 5.1 is moved towards the workpiece to clamp the workpiece in the above-mentioned fixed position. After the workpiece has been planed, the workpiece locking bar 5.1 is moved longitudinally away from the finished workpiece to release the finished workpiece to allow the removal thereof. The longitudinal back and forth movement of the upright support 5.4, and the workpiece locking bar 5.1 secured thereon, on the guide rail 5.3 is provided by conventional means, such as by a hydraulic cylinder well known in the art, as will be discussed below.

The carriage 2 is provided with a horizontal pair of vertically spaced apart cutter heads 2.1 and 2.2. The cutter heads 2.1 and 2.2 are connected to headstocks 2.12 and 2.13, respectively, and the headstocks 2.12 and 2.13 are slidingly mounted for vertical movement on a guide member 2.3, the guide member 2.3 being fixedly secured by bolts to the carriage 2. The headstocks 2.12 and 2.13 are connected within the guide member 2.3 to a right and left threaded shaft which is turned by a wheel 2.4. Thus, when the wheel 2.4 is turned in one direction, the headstocks 2.12 and 2.13, and the cutter heads 2.1 and 2.2 secured thereon, will move vertically away from each other. Accordingly, when the wheel 2.4 is turned in the opposite direction, the headstocks 2.12 and 2.13, and the cutter heads 2.1 and 2.2 secured thereon, will move vertically towards each other. It is noted, as best shown in FIGS. 1 and 3, that the cutter heads 2.1 and 2.2 are disposed respectively above and below the workpiece when the workpiece is clamped between the workpiece locking bars 5.1 and 5.2, and that the cutter heads 2.1 and 2.2 can be vertically moved towards and away from the workpiece to a proper position, as set forth below, in order to plane the longitudinal wider top and bottom horizontal sides of the workpiece.

The carriage 2 is also provided with a vertical pair of horizontally spaced apart cutter heads 2.5 and 2.6. The cutter heads 2.5 and 2.6 are connected to headstocks 2.10 and 2.11, respectively, and the headstocks 2.10 and 2.11 are slidingly mounted for horizontal movement on a guide member 2.16, which is transverse to the longitudinal movement of the carriage 2. The guide member 2.16 is fixedly secured by conventional fastening means to the carriage 2. The headstocks 2.10 and 2.11 slide by means of a ball bearing guide system in individual sliding guides provided on opposte sides of the guide member 2.16 so that the headstocks 2.10 and 2.11 can be moved transversely, independent of each other, in opposite directions in order to independently move the cutter heads 2.5 and 2.6 horizontally towards and away from each other by a two sided copying system as set forth below.

It is noted, as best shown in FIGS. 1 and 2, that the cutter heads 2.5 and 2.6 are disposed respectively in front of and behind the workpiece when the workpiece is clamped between the workpiece locking bars 5.1 and 5.2 so that the cutter heads 2.5 and 2.6 can be horizontally moved, independently free from each other, towards and away from the workpiece as set forth below. As described above, the woodworking planer of the present invention can plane four longitudinally extending sides of the workpiece simultaneously, where the two sided copying system of the present invention will now be set forth below.

As best shown in FIGS. 1 and 2, a longitudinally extending copying model 6 is removably secured, at the opposite ends thereof, to the rear of the main frame 1 by upright supports 6.1 and 6.2. The copying model 6 is disposed in a predetermined aligned position to be longitudinally parallel to the workpiece when the workpiece is clamped between the workpiece locking bars 5.1 and 5.2. The longitudinally extending, thinner opposing vertical side edges of the copying model 6 have a predetermined configuration, such as being convexly bowed outwardly away from each other to have the configuration of a barrel stave, which configuration is to be copied into the workpiece as set forth below.

The two sided copying system further includes a transversely extending shorter first arm 2.14 fixedly connected to the rear end of the headstock 2.10, for movement therewith, and a transversely extending longer second arm 2.15 fixedly connected to the rear end of the headstock 2.11 for movement therewith. Copying rollers 2.8 and 2.9 are rotatably secured by the axles thereof to the free ends of the first and second arms 2.14 and 2.15, respectively, so that the axles of the copying rollers 2.8 and 2.9 extend in a vertical direction. The circumferences of the copying rollers 2.8 and 2.9 are disposed on opposite sides of the copying model 6 for rolling against the longitudinally extending thinner opposing vertical side edges thereof. The opposite ends of a tensioned coil spring 2.7 are secured to the facing free ends of the arms 2.14 and 2.15. Accordingly, the coil spring 2.7 is disposed between the arms 2.14 and 2.15 in a tensioned condition to force the arms 2.14 and 2.15 towards each other. This in turn forces the copying rollers 2.8 and 2.9 towards each other against the thinner opposing vertical side edges of the copying model 6.

Thus, according to the above-mentioned arrangement of the copying system, when the carriage 2 is moved longitudinally along the main frame 1, the shaping rollers 2.8 and 2.9 will follow the configuration of the thinner opposing vertical side edges of the copying model 6 which is mounted in a stationary position relative to the main frame 1, and cause the copying rollers 2.8 and 2.9 to independently move in a horizontal transverse direction relative to the main frame 1. Accordingly, the copying rollers 2.8 and 2.9 in turn cause the parts connected thereto to also move the same amount in the horizontal transverse direction.

Thus, the copying roller 2.8, the arm 2.14, the headstock 2.10 and lastly the cutter head 2.5 all move together in the horizontal transverse direction as a first unit. Likewise, the copying roller 2.9, the arm 2.15, the headstock 2.11 and lastly the cutter head 2.6 all move together in the horizontal transverse direction as a second unit which is independent from the above-mentioned first unit. It is noted, that the cutter heads 2.5 and 2.6 are disposed against the three opposing longitudinally extending side edges of the workpiece when the workpiece is clamped between the workpiece locking bars 5.1 and 5.2, so that the cutter heads 2.5 and 2.6 plane the thinner opposing side edges of the workpiece to the exact same configuration of the thinner opposing side edges of the copying model six by transmitting the shape thereof through the abovementioned copying system.

The woodworking planer of the present invention also includes a workpiece feeder system including a feeder 3 that can be either automatically or manually fed. The feeder 3 includes spaced apart channels or U-shaped members to receive the opposite ends of the workpiece therebetween, as best shown in FIG. 2, where the workpieces have already been aligned and the ends thereof have already been trimmed. The channels or U-shaped members are inclined downwardly towards the main frame 1 to provide a gravity feed of the workpieces. The workpieces are individually fed, one at a time, from the feeder 3 to the board positioner 4 disposed below the feeder 3. The workpiece drops into the space between the free ends of the bars 4.1 and the safety catches 4.2 of the board positioner 4, as best shown in FIGS. 2 and 3. The board positioner 4 is transversely moved over the main frame 1 by conventional means, such as a hydraulic cylinder well known in the art, as will be discussed below, in order to position the workpiece between the workpiece locking bars 5.1 for securement thereof in the workpiece locking device, as mentioned above.

Furthermore, an inclined ramp 1.1 is disposed below the workpiece locking device, as best shown in FIG. 1. The inclined ramp 1.1 acts as a chute to direct the finished workpiece onto a conveyor belt 1.2 which transports the finished workpiece away from the woodworking planer to the next work station. The ramp 1.1 and the conveyor belt 1.2 are mounted on an inclined upper front portion of the main frame 1 by conventional means well known in the art, where the conveyor belt 1.2 is disposed below and in front of the ramp 1.1.

Referring again to the drawings, the operation of the woodworking planer will now be described. Before starting the operation thereof, the carriage 2 is disposed in its starting position on the left side of the main frame 1, reference being made to in FIGS. 1 and 2, so that the horizontal cutter heads 2.1 and 2.2 are disposed above the workpiece locking bar 5.1 in a proper position for engaging the left end portion of the workpiece therebetween when the workpiece is clamped between the workpiece locking bars 5.1 and 5.2. Accordingly, the wheel 2.4 is turned so that the horizontal cutter heads 2.1 and 2.2 are sufficiently vertically spaced apart to properly plane the workpiece when disposed therebetween.

It is noted, that the workpiece locking bars 5.1 and 5.2 are thinner than the finished workpiece, see FIG. 3, so that the horizontal cutter heads 2.1 and 2.2 do not engage the workpiece locking bars 5.1 and 5.2. It is also noted, that in the starting position of the carriage 2, the vertical cutter heads 2.5 and 2.6 are positioned further to the left of the horizontal cutter heads 2.1 and 2.2 so that the vertical cutter heads 2.5 and 2.6, as well as the horizontal heads 2.1 and 2.2, do not interfere with the positioning of the workpiece between the workpiece locking bars 5.1 and 5.2.

With the carriage 2 in the starting position, the workpieces, the ends of which have already been trimmed, are aligned and fed into the feeder 3, as shown in FIG. 1. The first inserted workpiece now drops by gravity onto the board positioner 4 in the space provided between the free ends of the bars 4.1 and the safety catches 4.2, as indicated in FIG. 3.

A conventional switch is now closed, and the hydraulic cylinder of the board positioner 4 is activated to transversely move the board positioner 4 towards the workpiece locking device. During this transverse movement, the workpiece is clamped between the free ends of the bars 4.1 and the safety catches 4.2. It is noted, prior to the transverse movement of the board positioner 4, that the adjustable workpiece locking bar 5.1 is disposed in an unlocking position, which is its furthest left location near the left end of the guide rail 5.3.

When the workpiece is properly positioned between the workpiece locking bars 5.1 and 5.2, the board positioner 4 stops. Another conventional switch is now closed, and the hydraulic cylinder of the workpiece locking bar 5.1 is activated to longitudinally move the workpiece locking bar 5.1 towards the left end of the workpiece. When the workpiece is clamped between the workpiece locking bars 5.1 and 5.2, the longitudinal movement of the workpiece locking bar 5.1 is stopped. A further conventional switch is now closed, and the hydraulic cylinder of the board positioner 4 is again activated to transversely return the board positioner 4 to its original feeding position to receive the next workpiece. When the board positioner 4 is once again in its original feeding position, a still further conventional switch is closed to activate the hydraulic cylinder of the carriage 2, and to also activate the horizontal and vertical cutter heads 2.1, 2.2 and 2.5, 2.6.

The carriage 2 now proceeds to move longitudinally across the main frame 1 from the left side to the right side thereof, carrying the activated horizontal and vertical cutter heads 2.1, 2.2 and 2.5, 2.6 therewith to plane the four longitudinal sides of the workpiece, using the two sided copying system in the manner set forth above. Once the vertical cutter heads 2.5 and 2.6 pass to the right of the finished workpiece to a position on opposite sides of the workpiece locking bar 5.2, which has a width less than the finished workpiece, the carriage 2 stops. Another conventional switch is closed to reactivate the hydraulic cylinder of the workpiece locking bar 5.1 to longitudinally return the workpiece locking bar 5.1 to its original unlocking position, thus releasing the finished workpiece.

Once released, the finished workpiece drops onto the inclined ramp 1.1, and is directed onto the conveyor belt 1.2 for transporting the finished workpiece to the next work station. At the time when the workpiece locking bar 5.1 is returned to its unlocking position, another switch is closed to again activate the hydraulic cylinder of the carriage 2 to longitudinally return the carriage 2 to its original starting position on the left side of the main frame 1.

Accordingly, when the carriage 2 is once again in its starting position, the hydraulic cylinder of the board positioner 4 is again activated to transversely move the board positioner 4 and the next workpiece thereon towards the workpiece locking device to repeat the above mentioned procedure for the next workpiece, and the procedure continues until all the workpieces have been finished.

Numerous alterations of the structures herein discussed will suggest themselves to those skilled in the art. However, it is to be understood that the present disclosure relates to a preferred embodiment of the invention which is for the purpose of illustration only, and is not to be construed as a limitation of the invention.

What is claimed is:

1. A woodworking planer comprising:
   a main frame;
   a carriage;
   guide means for slidingly mounting said carriage on said main frame for alternating longitudinal movement along said main frame in a forward and backward direction;
   workpiece locking means provided on said main frame for releasingly securing a workpiece in a fixed position on said main frame relative to the longitudinal movement of said carriage; and
   cutting means provided on said carriage for movement therewith to plane four longitudinal sides of the workpiece simultaneously.

2. A woodworking planer according to claim 1, wherein said cutting means include a pair of horizontal cutter heads for planing two longitudinally extending opposing horizontal sides of the workpiece, and a pair of vertical cutter heads for planing two longitudinally extending opposing vertical sides of the workpiece.

3. A woodworking planer according to claim 2, wherein said carriage includes adjustment means to simultaneously move said horizontal cutter heads in a vertical direction towards and away from each other to a proper position for planning the workpiece when disposed between said horizontal cutter heads.

4. A woodworking planer according to claim 3, wherein said adjustment means includes a shaft having left and right handed threads thereon for engaging association with said horizontal cutter heads, and a wheel for rotating said shaft to vertically move said horizontal cutter heads to the proper planing position.

5. A woodworking planer according to claim 2, wherein a copying model is secured to said main frame, said copying model having longitudinally extending opposing vertical sides with predetermined shapes, said carriage including copying means engaged between said copying model and said vertical cutter heads to individually move said vertical cutter heads in horizontal directions toward and away from each other with respect to said vertical sides of said copying model for planing the two vertical sides of the workpiece to correspond to the predetermined shapes of said copying model when the workpiece is disposed between said vertical cutter heads.

6. A woodworking planer according to claim 5, wherein said copying means includes a first roller fixedly connected to one of said vertical cutter heads for transverse movement therewith, and a second roller fixedly connected to the other vertical cutter head for transverse movement therewith, said first roller being disposed on one longitudinally extending vertical side of said copying model for rolling there along when said carriage is moved, and said second roller being disposed on the opposite longitudinally extending vertical side of said copying model for rolling there along when said carriage is moved.

7. A woodworking planer according to claim 6, wherein spring means are provided between said first and second rollers to tension said first and second rollers toward each other into rolling positions against said longitudinally extending opposing vertical sides of said copying model.

8. A woodworking planer according to claim 1, wherein said workpiece locking means includes a pair of longitudinally spaced apart first and second locking bars for releasingly clamping opposite ends of the workpiece therebetween.

9. A woodworking planer according to claim 8, wherein said first locking bar includes positioning means for longitudinally sliding said first locking bar towards and away from said second locking bar to clamp and release the workpiece, said second locking bar being secured to said main frame in a fixed position.

10. A woodworking planer according to claim 9, wherein said positioning means cooperates with a workpiece positioner, said workpiece positioner includes conveying means for transversely moving each workpiece individually to a predetermined position between said first and second locking bars in order to be clamped by said first and second locking bars.

11. A woodworking planer according to claim 9, wherein an inclined ramp is disposed under said workpiece locking means, said ramps being downwardly directed to a conveyor belt so that when said positioning means moves said first locking bar to release the workpeice, the workpiece drops onto said ramp and is carried onto said conveyor belt in order to be transported to another work station.

12. A woodworking planer according to claim 1, wherein feeder means are mounted on said main frame to receive the workpieces for individually feeding the workpieces one at a time to said workpiece locking means, said feeder means including a feeder inclined dowardly toward said main frame to provide a gravity feed of the workpieces.

13. A woodworking planer according to claim 12, wherein said feeder means includes a workpiece positioner, said workpiece positioner including conveying means for transversely moving each workpiece individually from said feeder to a predetermined position between clamping members of said workpiece locking means.

14. A woodworking planer according to claim 1, wherein an inclined ramp is disposed under said workpiece locking means, said ramp being downwardly directed to a conveyor belt so that when said workpiece locking means releases the workpiece, the workpiece drops onto said ramp and is carried onto said conveyor belt in order to be transported away from said woodworking planer.

* * * * *